United States Patent [19]

Hosoi et al.

[11] Patent Number: 4,624,987
[45] Date of Patent: Nov. 25, 1986

[54] VINYL CHLORIDE POLYMER COMPOSITION

[75] Inventors: Hideki Hosoi, Kobe; Toshihiko Hasegawa, Hyogo; Hitoshi Hayashi, Kakogawa, all of Japan

[73] Assignee: Kanegafuchi Kagaku Kogyo Kabushiki Kaisha, Osaka, Japan

[21] Appl. No.: 727,474

[22] Filed: Apr. 26, 1985

[30] Foreign Application Priority Data

May 8, 1984 [JP] Japan ................................. 59-91240

[51] Int. Cl.$^4$ ..................... C08L 27/06; C08L 51/04
[52] U.S. Cl. ..................................... 525/84; 525/902
[58] Field of Search ................................. 525/84, 902

[56] References Cited

U.S. PATENT DOCUMENTS

| | | | |
|---|---|---|---|
| 3,907,928 | 9/1975 | Kumabe et al. | 525/84 |
| 4,041,106 | 8/1977 | Ide et al. | 525/84 |
| 4,431,772 | 2/1984 | Katto et al. | 525/80 |
| 4,508,876 | 4/1985 | Takaki et al. | 525/310 |

FOREIGN PATENT DOCUMENTS 49-18621 5/1974 Japan .

*Primary Examiner*—Carman J. Seccuro
*Attorney, Agent, or Firm*—Armstrong, Nikaido, Marmelstein & Kubovcik

[57] ABSTRACT

A vinyl chloride polymer composition comprising (A) 5 to 50% by weight of a MBS resin prepared by firstly graft-polymerizing 15 to 40 parts by weight of monomer component comprising 80 to 100% by weight of methyl methacrylate and 20 to 0% by weight of one or more other vinyl monomers capable of copolymerizing with methyl methacrylate onto 40 to 70 parts by weight of a styrene-butadiene rubber including not more than 50% by weight of styrene, and then, onto the obtained copolymer, secondly graft-polymerizing 10 to 40 parts by weight of monomer component comprising 80 to 100% by weight of styrene and 20 to 0% by weight of one or other vinyl monomers capable of copolymerizing with styrene, a total amount of said styrene-butadiene rubber, the first graft-polymerizing monomer component and the second graft-polymerizing monomer component being 100 parts by weight, and (B) 95 to 50% by weight of vinyl chloride polymer wherein;

(i) an amount of said first graft-polymerizing monomer component including methyl methacrylate as a main component being 40 to 80% by weight based on the total weight of the first and second graft-polymerizing monomer components and (ii) said MBS resin prepared by graft-polymerizing under the condition that agglomeration of said styrene-butadiene rubber substantially does not occur in the course of the graft-polymerization having an average particle size of not less than 1500 Å and a proportion of particles having a particle size of not more than 1000 Å being not more than 20% by weight and that having a particle size of not less than 3000 Å being not more than 20% by weight. A molded article of the vinyl chloride polymer composition has excellent solvent-resistance, transparency and impact-resistance.

11 Claims, 2 Drawing Figures

VINYL CHLORIDE POLYMER COMPOSITION

BACKGROUND OF THE INVENTION

The present invention relates to a vinyl chloride polymer composition prepared by blending a copolymer which prepared by firstly graft-polymerization methyl methacrylate as a main compohent onto a styrene-butadiene rubber, and then, onto the obtained copolymer, secondly graft-polymerizing styrene as a main component (hereinafter referred to as "MBS resin") prepared under the particular condition with vinyl chloride polymer; the polymer composition being capable of giving a molded article having excellent transparency and impact-resistance as well as excellent resistance to various solvents.

It has been known that vinyl chloride polymer has excellent solvent-resistance, low and transparency in comparison with other widley use resin but has poor impact-resistance.

In order to improve the impact-resistance, MBS resin has been developed and vinyl chloride polymer blended with MBS resin is widely employed for food packing, beauty kit, and the like.

As above, in case that MBS resin is employed, the impact-resistance in a molded article of vinyl chloride polymer can be improved, but excellent transparency or whitening property in bending which vinyl chloride polymer, per se, possesses tends to lower by adding MBS resin. Therefore, when MBS resin is employed in practical use, it is the most important problem how is the impact-resistance increased while minimizing the lowering of the above properties and there has been carried out various studies. However, in case that MBS resin is practically employed, it is practical that a suitable kind of MBS resin is selected and employed depending upon the properties to be desired into vinyl chloride polymer.

The impact-resistance in a molded article of vinyl chloride polymer can be improved by employing a vinyl chlorde polymer to which MBS resin is added (hereinafter referred to as "reinforced vinyl chloride polymer"). In case that the molded article is a casing, the casing is filled with edible oil such as corn oil or olive oil and a stress is applied more powerful to the casing in the course of transport or storage, the impact-resistance remarkably lowers, and in the extreme case, there might be little difference in impact-resistance between vinyl chloride polymer to which MBS resin is not added and the reinforced vinyl chloride polymer.

In the instant specification, "impact-resistance is excellent" means that the property of maintaining the strength is excellent under the above condition.

That is to say, it cannot be recognized that the correlation exists between the case that MBS resin can improve the impact-resistance in a molded article of vinyl chloride polymer when, as is generally employed, the above-mentioned stress is not applied to vinyl chloride polymer, and the case that MBS resin can retain the impact-resistance in a molded article of vinyl chloride polymer when the above-mentioned stress is applied to the vinyl chloride polymer.

Therefore, it is proposed in Japanese Examined Patent Publication (Tokkyo Kokoku) No. 18621/1974 that a particularly prepared MBS resin is suitable for use in which solvent-resistance is required.

In Japanese Examined Patent Publication No. 18621/1974, there is disclosed that MBS resin is prepared by firstly graft-polymerizing monomers including styrene as a main component onto a butadiene rubber including a proportion of particles having a particle size of not less than 0.15 $\mu$m (1500 Å) being not less than 50% (% by weight, hereinafter referred to as "%") and that having a particle size of not more than 0.1$\mu$ (1000 Å) being not more than 15%, and then thereonto graft-polymerizing methyl methacrylate. According to the above-mentioned technique, the solvent-resistance is improved in comparison with the case employing a conventional MBS resin, but still it is unsatisfactory.

As above, in order to obtain MBS resin which can give excellent solvent-resistance into the molded article of vinyl chloride polymer, it is assumed that different technique or technical combination from the means of preparing a usual MBS resin is necessay.

An object of the invention is to provide a vinyl chloride polymer composition capable of giving a molded article having excellent solvent-resistance, transparency and impact-resistance.

SUMMARY OF THE INVENTION

In the present invention, a vinyl chloride polymer composition, capable of giving a molded article having excellent solvent-resistance, transparency and impact-resistance, comprising (A) 5 to 50% of MBS resin prepared by firstly graft-polymerizing 15 to 40 parts (part by weight; hereinafter referred to as "part") of monomer component comprising 80 to 100% of methyl methacrylate and 20 to 0% of one or more other vinyl monomers capable of copolymerizing with methyl methacrylate onto 40 to 70 parts of a styrene-butadiene rubber including not more than 50% of styrene, and then, onto the obtained copolymer, secondly graft-polymerizing 10 to 40 parts of monomer component comprising 80 to 100% of styrene and 20 to 0% of one or more other vinyl monomers capable of copolymerizing with styrene, a total amount of the styrene-butadiene rubber, the first graft-polymerizing monomer component and the second graft-polymerizing monomer component being 100 parts, and (B) 95 to 50% of vinyl chloride polymer, (i) an amount of the first graft-polymerizing monomer component including methyl methacrylate as a main component being 40 to 80% based on the total weight of the first and second graft-polymerizing monomer components and (ii) the MBS resin prepared by polymerizing under the condition that the agglomeration of the styrene-butadiene rubber substantially does not occur in the course of graft-polymerization having an average particle size of not less than 1500 Å, and a proportion of particles having a particle size of not more than 1000 Å being not more than 20% and that having a particle size of not less than 3000 Å being not more than 20%.

DETAILED DESCRIPTION

Figure 1:
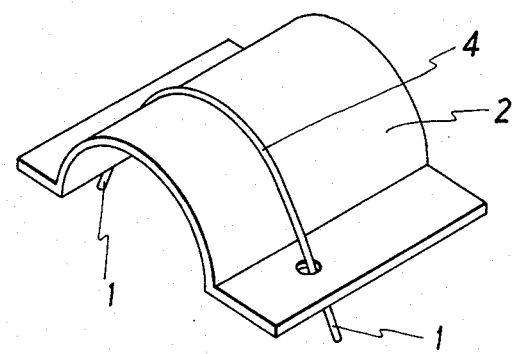
FIG. 1 is an illustration view of the preparation method of a sample in case the solvent-resistance in a molded article of the reinforced vinyl chloride polymer is measured.

In the present invention, when MBS resin is prepared, it is essential that the following three conditions are satisfied. That is to say, the first condition is that kind and amount of the first graft-polymerizing monomer component are predetermined, the second condition is that the agglomeration of styrene-butadiene rubber does not substantially occur in the course of graft-polymerization and the third condition is that MBS resin obtained under the above condition has the predetermined average particle size, the predetermined proportion having a particle size of not more than 1000 Å and that having a particle size of not less than 3000 Å.

In the first condition, it is essential that methyl methacrylate is a main component and an amount of this first graft-polymerizing monomer component being methyl methacrylate as a main component is 40 to 80% based on the total weight of the first and second graft-polymerizing monomer components in order to improve the solvent-resistance in a molded article of the reinforced vinyl chloride polymer. The solvent-resistance in a molded article of the reinforced vinyl chloride polymer is poor when, in the first graft-polymerizing monomer component, a compound other than methyl methacrylate is employed as a main component or an amount of the first graft-polymerizing monomer component is not more than or not less than the above proportion.

In the second condition, it is important that the polymerization condition that agglomeration of the styrene-butadiene rubber substantially does not occur in the course of graft-polymerization is selected in order to improve the solvent-resistance. The method for causing the agglomeration of a styrene-butadiene rubber in the course of graft-polymerization, which is required when an usual MBS resin is prepared and known as a suitable technique for increasing the impact-resistance while maintaining the transparency in a molded article of vinyl chloride polymer, is not preferable in order to improve solvent-resistance in a molded article of the reinforced vinyl chloride polymer.

In the third condition, in order to improve the solvent-resistance in a molded article of the reinforced vinyl chloride polymer, it is important that the particle size and particle size distribution of MBS resin obtained by grafat-polymerizing under the above conditions are controlled. The solvent-resistance is not substatially improved when an average particle size is not more than 1500 Å, it is quite different from the case in which usually employed MBS resin is employed. That is to say, when a particle size of MBS resin is not more than 1000 Å, the solvent-resistance in a molded article of the vinyl chloride polymer is not quite improved. That is, when MBS resin having particle size of not more than 1000 Å exists, the effect of improving the solvent-resistance becomes poor. On the other hand, as known, it is not preferable that MBS resin having macro-particle size of not less than 3000 Å exists, from the viewpoint of the transparency in a molded article of the reinforced vinyl chloride polymer. That is to say, in order to maintain a practical transparency and to improve a solvent-resistance of the molded article, it is preferable that the average particle size is not less than 1500 Å, and further, the less proportion of the particles having a particle size of not more than 1000 Å or the less proportion of the particle size of not less than 3000 Å, the better transparency and solvent-resistance. Only in case that the above three conditions are satisfied, MBS resin employed in the reinforced vinyl chloride polymer for obtaining a molded article of the reinforced vinyl chloride polymer, having excellent solvent-resistance and transparency, which cannot be obtained in conventional technique, can be prepared.

In the invention, the styrene-butadiene rubber latex employed for preparing MBS resin is prepared in a usual emulsion polymerization. It is preferable that a content of styrene in the styrene-butadiene rubber is not more than 50%, more preferably not more than 30% from the viewpoint of improving the solvent-resistance, transparency and impact-resistance in the molded article of the reinforced vinyl chloride polymer. The styrene-butadiene rubber latex can be prepared by a conventional method. When the above rubber latex is prepared, it is possible to add a conventional molecular weight modifier or a cross-linking agent. An amount of the styrene-butadiene rubber employed in the invention is 40 to 70 parts, preferably 50 to 65 parts as a solid based on 100 parts of MBS resin. In case that the above amount is more than the above range, the transparency in the molded article of the reinforced vinyl chloride polymer remarkably lowers. On the other hand, in case that the above amount is less than the above range, the impact-resistance is poor.

The styrene-butadiene rubber latex of the invention may be prepared by adding a conventional agglomerating agent such as hydrochloric acid or sulfuric acid into the rubber latex having an average particle size of 500 to 1300 Å, which obtained by means of conventional method. However, it is more preferable that the rubber having an average particle size of not less than 1300 Å, preferably not less than 1500 Å, which is obtained by means of conventional seed-polymerization is employed, because a proportion of particles of MBS resin, which is obtained by graft-polymerization, having a particle size of not more than 1000 Å and that having a particle size of not less than 3000 Å are decreased. That is, in the styrene-butadiene rubber of the invention, the average particle size is not less than 1300 Å, preferably 1500 Å, a proportion of particles having a particle size of not more than 1000 Å is not more than 30%, preferably 15%, more preferably 0% and a proportion of particles having a particle size of not less than 3000 Å is not more than 10%, preferably 0%.

It is important that MBS resin, obtained by graft-polymerizing onto the styrene-butadiene rubber under a polymerization condition that the agglomeration of styrene-butadiene rubber does not substantially occur in the course of graft-polymerization, has an average particle size of not less than 1500 Å, a proportion of particles having a particle size of not more than 1000 Å being not more than 20%, preferably 10%, and more preferably 0% and a proportion of particles having a particle size of not less than 3000 Å being not more than 20%, preferably 10%, more preferably 0% in order to improve the solvent-resistance and transparency in the molded article of the reinforced vinyl chloride polymer.

On the other hand, a MBS resin prepared by adding to a latex of styrene-butadiene rubber having a particle size of 500 to 1300 Å obtained by conventional polymerization method scarcely causes agglomeration of the styrene-butadiene rubber, but causes the agglomeration during the graft-polymerization so as to make the particle size of the produced MBS resin large (for instance, sodium chloride, sodium sulfate, sodium carbonate, and the like) is not practical, even if the average particle size and the proportion of particles having a particle size of not more than 1000 Å and that having a particle size of not less than 3000 Å fall within the scope of the present invention, because molded article of the reinforced vinyl chloride polymer is poor in solvent-resistance.

Fifteen to 40 parts, preferably 15 to 30 parts of the first graft-polymerizing monomer component, which is graft-polymerized so as to become 100 parts of the MBS resin based on 40 to 70 parts of styrene-butadiene rubber, comprises 80 to 100 %, preferably 90 to 100% of methyl methacrylate and 0 to 20%, preferably 0 to 10% of one or more other vinyl monomers capable of copolymerizing with methyl methacrylate. Examples of the other vinyl monomers capable of copolymerizing with methyl methacrylate are, for instance, alkyl methacrylate such as ethyl methacrylate, butyl methacrylate, alkyl acrylate such as ethyl acrylate, butyl acrylate, styrene, acrylonitrile, and the like.

In case that an amount of methyl methacrylate in the first graft-polymerizing monomer component is less than 80%, it is not preferable since the solvent-resistance in the molded article of the reinforced vinyl chloride polymer is poor.

As afore-mentioned, it is practical that an amount of methyl methacrylate in the first graft-polymerizing monomer component is more than 80%, preferably more than 90% and an amount of the first graft-polymerizing monomer component is 40 to 80%, preferably 40 to 70% based on the total weight of the first and second graft-polymerizing monomer components in order to increase the solvent-resistance in the molded article of the reinforced vinyl chloride polymer. In case that the amount of the first graft-polymerizing monomer component is less than 40% based on the total weight of the first and second graft-polymerizing monomer components, it is not preferable from the viewpoint of the solvent-resistance in the molded article. On the other hand, in case that the above amount of more than the above range, it is not practical from the viewpoint of the impact-resistance and solvent-resistance in the molded article.

After completing substantially the first graft-polymerization, the second graft-polymerizing monomer component which is 10 to 40 parts, preferably 15 to 30 parts based on the 100 parts of MBS resin is graft-polymerized. The second graft-polymerizing monomer component comprises 80 to 100%, preferably 90 to 100% of styrene and 0 to 20%, preferably 0 to 10% of one or more other vinyl monomers capable of copolymerizing with styrene.

Examples of the other vinyl monomer capable of copolymerizing with styrene are, for instance, alkyl acrylate such as ethyl acrylate, butyl acrylate, alkyl methacrylate such as methyl methacrylate, ethyl methacrylate, butyl methacrylate, acrylonitrile, and the like.

After adding a conventional antioxidant, heat-stabilizer, or the like into the obtained graft-copolymer latex, an aquious solution of acid or salt is added into the latex and the latex is subjected to salting-out, filtration and drying to give the MBS resin.

The reinforced vinyl chloride polymer of the present invention is prepared by blending 5 to 50 parts of the MBS resin prepared in the invention with 50 to 95 parts of vinyl chloride polymer having not less than 80% of vinyl chloride monomer so that the total amount of the MBS resin and vinyl chloride polymer is 100 parts.

In case that the MBS resin is blended with vinyl chloride polymer and the reinforced vinyl chloride polymer is processed, any conventional technique can be employed.

The present invention is more specifically described and explained by means of the following Examples. It is to be understood that the present invention is not limited to Examples, and various changes and modifications may be made in the invention without departing from the spirit and scope thereof.

EXAMPLE 1

After the space in an autoclave provided with an agitator was thoroughly displaced with nitrogen gas, the autoclave was charged with the following components and the polymerization was carried out at 50° C. for 15 hours with agitating.

| Butadiene | 75 parts |
| --- | --- |
| Styrene | 25 parts |
| Polyethyleneglycol dimethacrylate | 1.0 part |
| Di-isopropyl benzenehydroperoxide | 0.2 part |
| Sodium formaldehyde sulfoxylate | 0.2 part |
| Di-sodium salt of ethylenediaminetetraacetic acid (hereinafter referred to as "di-sodium salt of EDTA") | 0.006 part |
| Ferrous sulfate ($FeSO_4.7H_2O$) | 0.002 part |
| Sodium pyrophosphate | 0.3 part |
| Sodium oleate | 2.0 parts |
| Deionized water | 200 parts |

A rubber latex having a conversion of about 98% and an average particle size of 800 Å (hereinafter referred to as "latex A") was obtained. After the space in an autoclave provided with an agitator was thoroughly displaced with nitrogen gas as above-mentioned, the autoclave was charged with the following components and the polymerization was carried out at 50° C. for 50 hours.

| Latex A | 8 parts (as solid) |
| --- | --- |
| Styrene | 69 parts |
| Butadiene | 23 parts |
| Di-isopropyl benzenehydroperoxide | 0.1 part |
| Sodium formaldehyde sulfoxylate | 0.1 part |
| Di-sodium salt of EDTA | 0.004 part |
| Ferrous sulfate ($FeSO_4.7H_2O$) | 0.001 part |
| Sodium pyrophosphate | 0.3 part |
| Sodium oleate | 0.5 part |
| Deionized water | 150 parts |

At every 10 hours from the beginning of the polymerization, 0.1 part of di-isopropyl benzenehydroperoxide and 0.1 part of sodium formaldehyde sulfoxylate were added into the polymerization mixture. On the other hand, 1.5 parts of sodium oleate (as 1% of aqueous solution of sodium oleate) was continuously added into the above mixture for 40 hours. The obtained latex (hereinafter referred to as "latex B") had a latest conversion of about 95% and an average particle size of 1700 Å. It was recognized by means of electron microscope that the latex B did not have particles having a particle size of not more than 1000 Å and those having a particle size of not less than 3000 Å.

A glass casing was charged with the following components while displacing with nitrogen gas and the mixture was agitated at 70° C.

| Latex B | 55 parts (as solid) |
| --- | --- |
| Di-sodium salt of EDTA | 0.008 part |
| Ferrous sulfate ($FeSO_4.7H_2O$) | 0.002 part |
| Sodium formaldehyde sulfoxylate | 0.2 part |

| | |
|---|---|
| -continued | |
| Deionized water | 250 parts |

The following components were continuously added into the above mixture for 2 hours.

| | |
|---|---|
| Methyl methacrylate | 22.5 parts |
| Di-isopropyl benzenehydroperoxide | 0.1 part |

After completing the adding, the agitation was further continued for 1 hour. A conversion was 98%. And further continuously the following components were added into the reaction mixture for 2 hours.

| | |
|---|---|
| Styrene | 22.5 parts |
| Di-isopropyl benzenehydroperoxide | 0.2 part |

After completing the adding, 0.1 part of di-isopropyl benzenehydroperoxide was added into the polymerization mixture and the agitation was continued for 3 hours. The obtained latex had a conversion of 98% and an average particle size of 1900 Å (hereinafter referred to as "latex C"). It was recognized by means of an electron microscope that the latex C did not have particles having a particle size of not more than 1000 Å and those having a particle size of not less than 3000 Å.

On the other hand, it was confirmed by the following method as to whether the agglomeration of particles occured or not. That is, in case that the number of particles in latex did not changed, a particle size of graft-polymerized latex (MBS resin latex) (d) was shown by the following equation:

$$d = \sqrt[3]{\frac{M}{Mo}} \cdot do$$

wherein Mo is parts of a charged styrene-butadiene rubber, M is total of parts of a charged rubber and grafting monomer components (=100 parts) and do is a particle size of a styrene-butadiene rubber. In case that a styrene-butadiene rubber latex having an average particle size of 1700 Å was employed, a calculated value of an average particle size MBS resin latex was 2070 Å.

From the result of the obtained average particle size and the calculated value by the above equation, it was recognized that the agglomeration of styrene-butadiene particles did not occur in the course of graft-polymerization except that the styrene-butadiene particles naturally grew by the graft-layer over the styrene-butadiene rubber particle.

There were added 1 part of 2,6-di-t-bytyl-p-cresol (BHT) and 0.5 part of di-laurylthiodipropionate as stabilizer into the obtained latex C, and the mixture was thoroughly agitated. And then an aqueous hydrochloric acid solution was added into the mixture and the mixture was subjected to coagulation, dehydration and drying.

There were blended the following components. After blending the components thoroughly by a blender, a strand having a diameter of 5 mm was extruded through a Brabender-plastography under the following condition.

| | |
|---|---|
| Vinyl chloride polymer ($\overline{P}$ = 700) | 100 parts |
| Calcium-zinc stabilizer | 0.6 part |
| Lubricant | 0.5 part |
| Improving agent of processability | 2.0 parts |
| β-Diketone stabilizer (sold by Rhone-Poulenc SA under the registered trade mark "RHODIA STAB-50") | 0.4 part |
| The obtained MBS resin | 10 parts |

Extruding condition through a Brabender-plastograph

| | $C_1$ | $C_2$ | D |
|---|---|---|---|
| Temperature: | 155° C. | 205° C. | 195° C. |
| Number of rotation: | | 35 rpm | |

Figure 2:
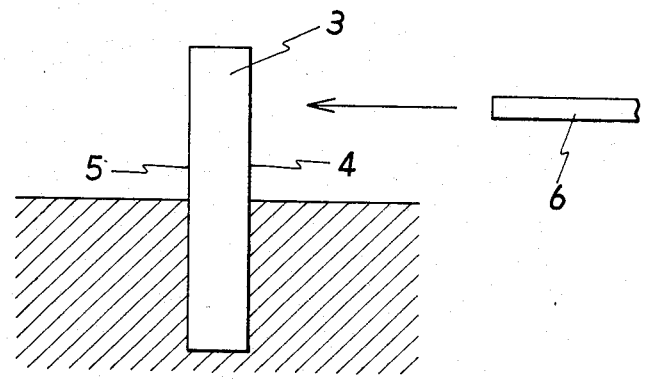
FIG. 2 is an illustration view of a direction of a sample set on an Izot-impact tester in case a proportion of samples showing ductile fracture is measured.

The obtained strand 1 was set on a half-cylinder 2 having a diameter of 20 cm as shown in FIG. 1. A surface side 4 was an outside of strand 1 set on a half-cylinder 2 and a reverse side 5 was an inside of that. After dipping the strand 1 in a mixed solution including corn oil (made by Ajinomoto Co., Inc.) and 10% of cyclohexane to the above corn oil at room temperature for times shown in Table 1, the strand 1 was cut 6 cm by 6 cm. The obtained samples 3 (total numbers were 8 pieces) were set as shown in FIG. 2 and the breakdown test was carried out by employing an Izot-impact tester and a hammer 6. The results of the breakdown test were judged by the following criteria.

Brittle fracture: The sample which was completely broken out to be two pieces.

Ductile fracture: The sample which was whitened at a broken section and was broken but not separated or which was not broken.

To be good or not of the impact-resistance of the samples was judged by numbering the samples showing ductile fracture.

The results are shown in Table 1.

On the other hand, 10 parts of the obtained MBS resin was blending with 103 parts of vinyl chloride polymer ($\overline{P}$=700) including 3 parts of tin stabilizer and the blended vinyl chloride polymer was roll-kneaded at 155° C. for 8 minutes. The obtained vinyl chloride polymer was pressed at 180° C. for 15 minutes, and then an Izot-impact strength was measured. Izot-impact strength was measured according to JIS K 7110.

The results are shown in Table 1.

EXAMPLES 2 TO 4 AND COMPARATIVE EXAMPLES 1 TO 6

The procedure in Example 1 was repeated except that monomer components of the first and second polymerization were employed as shown in Table 1.

The results are shown in Table 1.

TABLE 1

| | Monomer component in the first polymerization (part) | | Monomer component in the second polymerization (part) | | Number of the samples showing ductile fracture among 8 samples Dipping time in a mixed solution including corn oil and cyclohexan | | | | Izod-impact strength (kgcm/cm$^2$) |
|---|---|---|---|---|---|---|---|---|---|
| | MMA | ST | ST | MMA | 60 min | 70 min | 80 min | 90 min | |
| Ex. 1 | 22.5 | — | 22.5 | — | 8 | 8 | 3 | 2 | 12.2 |
| Ex. 2 | 27.5 | — | 17.5 | — | 8 | 6 | 7 | 3 | 11.4 |
| Ex. 3 | 19.5 | — | 22.5 | 3 | 3 | 4 | 3 | 0 | 12.8 |
| Ex. 4 | 22.5 | 2 | 20.5 | — | 7 | 5 | 7 | 2 | 14.8 |
| Com. Ex. 1 | — | 22.5 | — | 22.5 | 1 | 0 | 0 | 0 | — |
| Com. Ex. 2 | 45 | — | — | — | 0 | 3 | 2 | 0 | 7.1 |
| Com. Ex. 3 | 22.5 | 22.5 | — | — | 2 | 0 | 0 | 0 | 18.5 |
| Com. Ex. 4 | 13.5 | — | 22.5 | 9 | 4 | 0 | 0 | 0 | 11.5 |
| Com. Ex. 5 | 13.5 | 9 | 13.5 | 9 | 0 | 0 | 0 | 0 | — |
| Com. Ex. 6 | 22.5 | — | 10 | 10 | 6 | 1 | 0 | 0 | 10.0 |

MMA: Methyl methacrylate
ST: Styrene

From the Table 1, in order to maintain the solvent-resistance in the molded article of the reinforced vinyl chloride polymer, it is important that the monomer component including methyl methacrylate as a main component was firstly graft-polymerized onto the styrene-butadiene rubber. As shown in Comparative Example 1, in contrast with the present invention, MBS resin was prepared by graft-polymerizing firstly styrene onto the styrene-butadiene rubber and then secondly methyl methacrylate onto the obtained rubber was not preferable from the viewpoint of improving the solvent-resistance in a molded article of the reinforced vinyl chloride polymer.

Further, from Table 1, it was preferable that an amount of the monomer component including methyl methacrylate as a main component, which is graft-polymerized firstly onto the styrene-butadiene rubber was 40 to 80% based on the total graft-polymerizing monomer components from the viewpoint of improving the solvent-resistance. That is, in case that an amount of the first graft-polymerizing monomer component was less than 40%, the solvent-resistance was poor, on the other hand, in case that the above amount was more than 80%, it was not practical that the solvent-resistance and the Izot-strength became poor. And further, in case that the reinforced vinyl chloride polymer prepared by one-step polymerization of mixture of the first graft-polymerizing monomer component and the second graft-polymerizing monomer component, it was not practical that the solvent-resistance lowered remarkably.

EXAMPLE 5

The latex A (obtained in Example 1) having a particle size of 800 Å was employed as a seed, and the procedure in Example 1 was repeated except that styrene-butadiene rubber latex was prepared by the seed-polymerization of the following components.

| | |
|---|---|
| Latex A | 11 parts (as solid) |
| Styrene | 22.25 parts |
| Butadiene | 66.75 parts |

The obtained latex (hereinafter referred to as "latex D") had an average particle size of 1520 Å. The procedure in Example 1 was repeated except that the latex D was emplyed to give MBS resin.

The obtained MBS resin latex had an average particle size of 1700 Å and did not have particles having a particle size of not more than 1000 Å and those having a particle size of less than 3000 Å.

The samples were prepared and measured in the same manner as in Example 1.

The results are shown in Table 2.

COMPARATIVE EXAMPLE 7

After displacing an autoclave provided with an agitator thoroughly with nitrogen gas, the autoclave was charged with the following components. The polymerization was carried out at 40° C. for 14 hours to give a rubber latex (hereinafter referred to as "latex E").

| | |
|---|---|
| Butadiene | 75 parts |
| Styrene | 25 parts |
| n-Dodecyl mercaptane | 0.4 part |
| Di-isopropyl benzenehydroperoxide | 0.1 part |
| Sodium formaldehyde sulfoxylate | 0.1 part |
| Di-sodium salt of EDTA | 0.004 part |
| Ferrous sulfate (FeSO$_4$.7H$_2$O) | 0.002 part |
| Sodium pyrophosphate | 0.4 part |
| Sodium oleate | 6.0 parts |
| Deionized water | 200 parts |

The obtained latex had a conversion of about 95% and an average particle size of 600 Å.

A glass casing was charged with the following component while displacing with nitrogen gas and the mixture was agitated at 70° C.

| | |
|---|---|
| Latex E | 55 parts (as solid) |
| Deionized water | 250 parts |
| Di-sodium salt of EDTA | 0.008 part |
| Ferrous sulfate (FeSO$_4$.7H$_2$O) | 0.002 part |
| Sodium formaldehyde sulfoxylate | 0.2 part |

And then the polymerization was carried out in the same manner as in Example 1 to give MBS resin.

The obtained MBS resin had an average particle size of 700 Å and all particles of the obtained MBS resin had a particle size of not more than 1000 Å.

The samples were prepared and measured in the same manner as in Example 1 by employing the obtained MBS resin.

The results are shown in Table 2.

COMPARATIVE EXAMPLE 8

The procedure in Comparative Example 7 was repeated except that 1.58 parts of sodium sulfate (as 10% aqueous sodium sulfate solution) was added into the styrene-butadiene rubber latex 30 minutes before the graft-polymerization to give MBS resin.

An average particle size of the styrene-butadiene rubber latex before the adding of the first graft-polymerizing monomer component was 620 Å. The obtained MBS resin latex had an average particle size of 1880 Å and a proportion of particles having a particle size of not more than 1000 Å being about 10% and that having a particle size of not less than 3000 Å being about 15%.

The samples were prepared and measured in the same manner as in Example 1.

The results are shown in Table 2.

COMPARATIVE EXAMPLE 9

The procedure in Comparative Example 7 was repeated except that 0.91 part of acetic acid (as 10% of aqueous acetic acid solution) was added instead of sodium sulfate and further 2% sodium hydroxide was added to stabilize to give MBS resin.

An aqueous acetic acid solution was added into the styrene-butadiene rubber latex and aquous sodium hydroxide solution was added to stabilize. The obtained rubber latex had an average particle size of 1200 Å. And further the rubber latex obtained by graft-polymerizing methyl methacrylate had an average particle size of 1900 Å and the MBS resin latex obtained by graft-polymerizing styrene onto the obtained latex had an average particle size of 2050 Å, a proportion of particles having a particle size of not more than 1000 Å being 23% and that having a particle size of not less than 3000 Å was 9%.

The samples were prepared and measured in the same manner as in Example 1 by employing the obtained MBS resin.

The results are shown in Table 2.

COMPARATIVE EXAMPLE 10

The procedure in Comparative Example 9 was repeated except that 0.2 part of hydrogen chloride (as 0.3% of aqueous hydrochloric acid solution) was added instead of aqueous acetic acid solution to give MBS resin. An average particle size, a proportion of particles having a particle size of not more than 1000 Å and that having a particle size of not less than 3000 Å were shown in Table 2.

The samples were prepared and measured in the same manner as in Example 1 by employing the obtained MBS resin.

The results are shown in Table 2.

had an average particle size of not less than 1500 Å, in case that the above MBS resin had a proportion of particles having a particle size of not mor than 1000 Å being not less than 20%, it was recognized that solvent-resistance in the molded article of the reinforced vinyl chloride polymer was poor. On the other hand, even if MBS resin had an average particle size of not less than 1500 Å, in case that the above MBS resin was prepared by polymerizing while agglomerating, it was not preferable to improve solvent-resistance in the molded article of the reinforced vinyl chloride polymer.

EXAMPLE 6

The procedure in Comparative Example 9 was repeated except that 0.33 part of hydrogen chloride (as 0.3% aqueous hydrochloric acid solution) was employed instead of aqueous acetic acid solution to give MBS resin.

An aqueous hydrochloric acid solution was added into the rubber latex and aqueous sodium hydroxide solution was added to stabilize. The obtained styrene-butadiene rubber latex had an average particle size of 1800 Å. And further, the MBS resin latex obtained by graft-polymerization had an average particle size of 2050 Å. A proportion of particles having a particle size of not more than 1000 Å and that having a particle size of not less than 3000 Å in the obtained MBS resin latex are shown in Table 3.

The samples were prepared in the same manner as in Example 1 by employing the obtained MBS resin, and total light transmittance and HAZE were measured.

The results are shown in Table 3.

In case of Example 1, total light transmittance and HAZE were measured in the same manner as in Example 6.

The results are shown in Table 3.

COMPARATIVE EXAMPLE 11

The procedure in Example 6 was repeated except that 0.38 part of hydrogen chloride was employed to give MBS resin.

An aqueous hydrochloric acid solution was added into the rubber latex and aqueous sodium hydroxide was added to stabilize. The obtained rubber latex had an average particle size of 2300 Å. An average particle size of MBS resin obtained by polymerization, a proportion of particles having a particle size of not more than 1000 Å and that having a particle size of not less than 3000 Å of the MBS resin are shown in Table 3.

TABLE 2

| | Kind and amount of agglomerating agent added into the styrene-butadiene rubber before the graft-polymerization (part) | | Average particle size of MBS resin (Å) | Proportion of each particle size in MBS resin (%) | | Number of the samples showing ductile fracture among 8 samples Dipping time in a mixed solution including corn oil and cyclohexane | | |
|---|---|---|---|---|---|---|---|---|
| | | | | not more than 1000 Å | not less than 1000 Å | 60 min | 90 min | 180 min |
| Ex. 1 | — | | 1900 | 0 | 0 | 8 | 7 | 7 |
| Ex. 5 | — | | 1700 | 0 | 0 | 7 | 6 | 4 |
| Com. Ex. 7 | — | | 700 | 100 | 0 | 0 | 0 | 0 |
| Com. Ex. 8 | Sodium sulfate | 1.58 | 1880 | 10 | 15 | 2 | 1 | 0 |
| Com. Ex. 9 | Acetic acid | 0.91 | 2050 | 23 | 9 | 4 | 7 | 0 |
| Com. Ex. 10 | Hydrogen chloride | 0.2 | 1560 | 27 | 10 | 3 | 2 | 0 |

From Table 2, it was recognized that MBS resin having an average particle size of not more than 1000 Å substantially did not have an effect of improving solvent-resistance in the molded article of the reinforced vinyl chloride polymer. And further, even if MBS resin The samples were prepared and measured in the same manner as in Example 6 by employing the obtained MBS resin.

The results are shown in Table 3.

TABLE 3

| | Amount of hydrogen chloride (part) | Average particle size and proportion of each particle size in MBS resin | | | Total light transmittance (%) | HAZE (%) | Number of the samples showing ductile fracture among 8 samples | | |
|---|---|---|---|---|---|---|---|---|---|
| | | Average particle size (Å) | Not more than 1000 Å (%) | Not less than 3000 Å (%) | | | Dipping time in a mixed solution including corn oil and cyclohexane | | |
| | | | | | | | 20 min | 40 min | 60 min |
| Ex. 1 | — | 1900 | 0 | 0 | 55.0 | 10.0 | 8 | 7 | 4 |
| Ex. 6 | 0.33 | 2050 | 18 | 16 | 55.0 | 24 | 5 | 1 | 0 |
| Com. Ex. 11 | 0.38 | 2510 | 13 | 39 | 52.0 | 30 | 6 | 3 | 2 |

From Table 3, in case that a proportion of particles having a particle size of not less than 3000 Å became large, it was not practical since transparency in the molded article of the reinforced vinyl chloride polymer tended to lower.

That is, in order to obtain MBS resin capable of improving solvent-resistance and transparency in a molded article of the reinforced vinyl chloride polymer, it was necessary that MBS resin had an average particle size of not less than 1500 Å, a proportion of particles having a particle size of not more than 1000 Å being not more than 20% and that having a particle size of not less than 3000 Å being not more than 20%.

What we claim is:

1. A vinyl chloride polymer composition, capable of giving a molded article having excellent solvent-resistance, transparency and impact-resistance, comprising (A) 5 to 50% by weight of a MBS resin prepared by firstly graft polyerizing 15 to 40 parts by weight of monomer component comprising 80 to 100% by weight of methyl methacrylate and 20 to 0% by weight of one or more other vinyl monomers capable of copolymerizing with methyl methacrylate onto 40 to 70 parts by weight of a styrene-butadiene rubber including not more than 50% by weight of styrene, said styrene-butadiene rubber having an average particle size of not less than 1300 Å and a proportion of particles having a particle size of not more than 1000 Å being not more than 30% by weight and a proportion of particles having a particle size of not less than 3000 Å being not more than 10% by weight, and then, onto the obtained copolymer, secondarly graft-polymerizing 10 to 40 parts by weight of monomer component comprising 80 to 100% by weight of styrene and 20 to 0% by weight of one or other vinyl monomers capable of copolymerizing with styrene, a total amount of said styrene-butadiene rubber, the first graft-polymerizing monomer component and the second graft-polymerizing monomer component being 100 parts by weight, and (B) 95 to 50% by weight of vinyl chloride polymer; wherein
   (i) an amount of said first graft-polymerizing monomer component including methyl methacrylate as a main component being 40 to 80% by weight based on the total weight of the first and second graft-polymerizing monomer components and
   (ii) said MBS resin is prepared by graft-polymerizing under the condition that agglomeration of said styrene-butadiene rubber substantially does not occur in the course of graft-polymerization, and asid MBS resin has having an average particle size of not less than 1500 Å and a proportion of particles having a particle size of not more than 1000 Å being not more than 20% by weight and that having a particle size of not less than 3000 Å being not more than 20% by weight.

2. The vinyl chloride polymer composition of claim 1, wherein said MBS resin is prepared by graft-polymerizing said first graft-polymerizing monomer component onto said styrene-butadiene rubber having an average particle size of not less than 1500 Å and a proportion of particles having a particle size of not more than 1000 Å being not more than 15% by weight and that having a particle size of not less than 3000 Å being not more than 10% by weight under the condition that the agglomeration of said styrene-butadiene rubber does not occur in the course of graft-polymerization.

3. The vinyl chloride polymer composition of claim 1, wherein said MBS resin is prepared by graft-polymerizing said first graft-polymerizing monomer component onto said styrene-butadiene rubber having an average particle size of not less than 1500 Å and a proportion of particles having a particle size of not more than 1000 Å being 0% by weight and that having a particle size of not less than 3000 Å being 0% by weight under the condition that the agglomeration of said styrene-butadiene rubber does not occur in the course of graft-polymerization.

4. The vinyl chloride polymer composition of claim 1, wherein said styrene-butadiene rubber includes not more than 30% by weight of styrene.

5. The vinyl chloride polymer composition of claim 1, wherein an amount of styrene-butadiene rubber is 50 to 65 parts by weight based on 100 parts by weight of said MBS resin.

6. The vinyl chloride polymer composition of claim 1, wherein said MBS resin has a proportion of particles having a particle size of not more than 1000 Å being not more than 10% by weight and that having a particle size of not less than 3000 Å being not more than 10% by weight.

7. The vinyl chloride polymer composition of claim 1, wherein an amount of said first graft-polymerizing monomer component is 15 to 30 parts by weight based on a total amount of said styrene-butadiene rubber and the first and second graft-polymerizing monomer components.

8. The vinyl chloride polymer composition of claim 1, wherein said first graft-polymerizing monomer component comprises 90 to 100% by weight of methyl methacrylate and 10 to 0% by weight of one or more other vinyl monomers capable of copolymerizing with methyl methacrylate.

9. The vinyl chloride polymer compostion of claim 1, wherein an amount of said first graft-polymerizing monomer component is 40 to 70% by weight based on a total of the first and second graft-polymerizing monomer components.

10. The vinyl chloride polymer composition of claim 1 wherein an amount of said second graft-polymerizing monomer component is 15 to 30 parts by weight based on 100 parts by weight of MBS resin.

11. The vinyl chloride polymer composition of claim 1, wherein said second graft-polymerizing monomer component comprises 90 to 100% by weight of styrene and 10 to 0% by weight of one or more other vinyl monomers capable of copolymerizing with styrene.

* * * * *